Dec. 6, 1966     P. H. VAN SLOUN     3,289,521

SECURING APPARATUS

Filed Oct. 12, 1964

INVENTOR.

PETER H. VAN SLOUN

BY Charles J. Ungemach

ATTORNEY

United States Patent Office 3,289,521
Patented Dec. 6, 1966

3,289,521
SECURING APPARATUS
Peter H. Van Sloun, Hopkins, Minn., assignor to
Honeywell Inc., a corporation of Delaware
Filed Oct. 12, 1964, Ser. No. 403,220
2 Claims. (Cl. 85—8.1)

This invention relates generally to securing devices and more specifically relates to a retaining pin having a flexible ring pivotally mounted to one end thereof, that can be deformed and rotated around the other end of the pin to secure the pin in place.

In many applications in industry today, it is necessary to provide means to secure two movable members in a fixed relationship with respect to each other. For example, it is often necessary to secure a shaft in a tube or other shaft supporting member. It is often necessary to secure a cap or other annular cover member to the end of a shaft or tube. In general, it is often necessary to place a first member within a second member or to place a first member adjacent a second member and then provide means to fasten the two members together so as to prevent relative movement between them. Although some applications may permit the two members to be permanently secured together, there is often a requirement that the means for securing the members together be removable so that the members may be taken apart for maintenance, for replacement of parts or for other purposes.

Many devices are available that will permit periodic releasing of the members. For example, the two members may be threaded together or various connector devices, too numerous to mention, may be employed. A device commonly used to secure such members together is the ordinary cotter pin. A cotter pin is a longitudinally split pin that can be inserted through corresponding holes in the members being fastened together. One end of a cotter pin is enlarged so that it will not slip through the hole and the other end of the pin is deformed after insertion so that the pin will be retained in the hole. Such pins can be removed only by physically bending the pin back to its original shape and then pulling it from the hole. More than a few repeated uses of such a pin will distort the configuration of the pin so that it can no longer be easily inserted in the hole in the members. Such cotter pins must therefore be replaced at frequent intervals if they are often removed from the members. Another disadvantage of this type of connector pin is the fact that tools are required to lock the pin in position and to release the pin. Further, the metal at the deformed end of the pin becomes brittle after a few uses and will often break, thus allowing the pin to slip from the holes in the members being secured together.

Where an easily releasable securing device is a positive requirement for a certain application, most of the retaining devices available today have certain disadvantages such as those outlined for the cotter pin above. If a threaded bolt and nut combination is used, vibration or twisting movements between the members may cause the nut to vibrate loose from the bolt. There is also the disadvantage that tools are normally required to properly connect such devices.

My invention overcomes the disadvantages inherent in the prior art securing devices by providing a securing pin that can easily be inserted and removed, that requires no tools for insertion or removal, and that will lock the pin securely in the holes in the members without being susceptible to vibration or other stresses occurring between the two members.

The object of the present invention is therefore to provide a securing pin for fastening together two members having corresponding holes therein, the pin extending through the holes and having a flexible ring pivotally mounted on one end thereof that can be rotated around the members and then deformed to pass over the other end of the pin to secure the pin in position.

Further objects of the invention will be apparent when the following description and claims are considered in conjunction with the accompanying drawings, in which:

Figure 4:
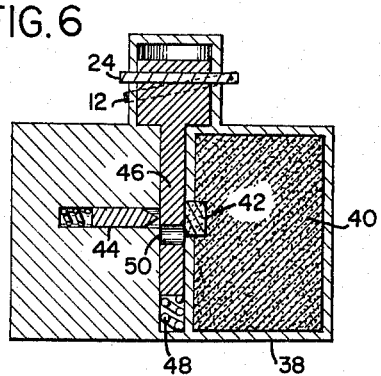
Figure 5:
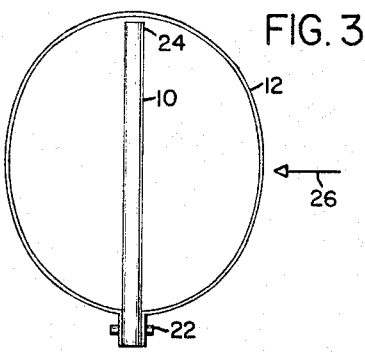
Figure 6:
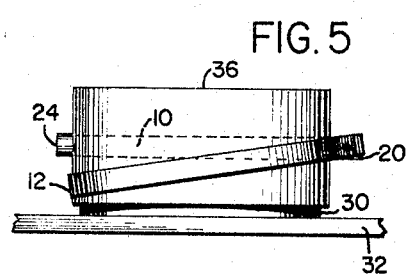

FIGURE 4 discloses a typical two member structure of the type that could be connected together by the subject of this invention;

FIGURE 5 is a side view of the two member structure shown in FIGURE 4 with holes therethrough in which the securing pin has been inserted, and around which the retaining ring has been placed to lock the pin in place; and FIGURE 6 is a schematic representation of the invention used in conjunction with a safing device for an explosive munition.

Figure 1:
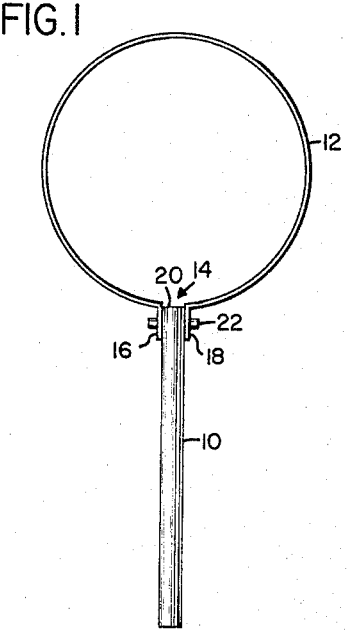
FIGURE 1 is a plan view of the securing pin and retaining ring with the pin rotated away from the ring in position to be inserted in the members to be secured together.

Referring again to the drawings, FIGURE 1 discloses the subject connector device that includes an elongated cylindrical securing pin 10 and a generally circular retaining ring 12. Pin 10 is solidly constructed from a metal such as steel or brass and is adapted to be inserted through holes in the members to be secured together. Ring 12 is constructed from a material such as steel and has a relatively thin periphery so that the ring is flexible. That is, pressure applied to opposing sides of the ring will cause the ring to deform or elongate into a generally elliptical form.

Ring 12 has an opening 14 formed in the periphery thereof that is equal in size to the diameter of pin 10. Attached to ring 12 on opposing sides of opening 14 are a pair of metal hinge members 16 and 18 that extend outwardly from the ring with respect to its center and lie in the same plane as the ring. A pair of holes, not shown, are formed in hinge members 16 and 18 and a corresponding hole, not shown, is formed in first end 20 of pin 10. A pivot pin 22 is inserted through the holes in hinge members 16 and 18 and through the hole in first end 20 of pin 10 to secure pin 10 and ring 12 together. Pin 10 is thus pivotally or rotatably mounted with respect to ring 12.

Figure 2:
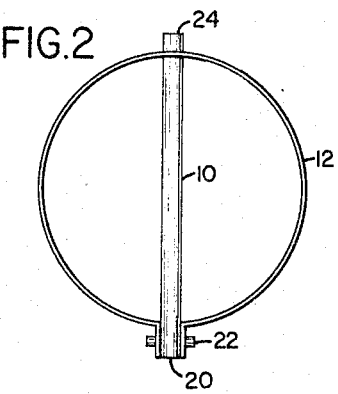
FIGURE 2 is a plan view of the securing pin and retaining ring with the pin rotated such that the end of the pin opposite the pivotal connection lies against the periphery of the ring.

In FIGURE 2, pin 10 has been rotated so that a second end 24 of pin 10 lies adjacent a portion of the periphery of ring 12 opposite opening 14. It can be seen from FIGURE 2 that the diameter of the central opening in ring 12 is smaller than the length of pin 10. Pin 10 can thus make less than one full revolution about pivot pin 22 with respect to ring 12 since second end 24 will always strike against the periphery of ring 12.

Figure 3:
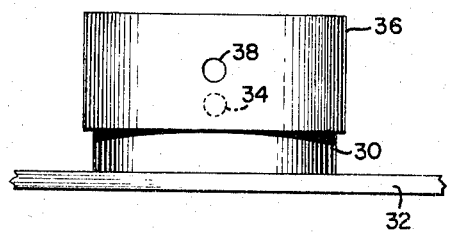
FIGURE 3 is a plan view of the pin and ring in the same relative position as in FIGURE 2 but with the ring distorted to allow the pin to rotate through the center of the ring.

In FIGURE 3, pin 10 and ring 12 are disclosed in the same relative position as shown in FIGURE 2. In FIGURE 3, however, a compressive force has been applied to opposing sides of ring 12 as indicated by arrows 26 and 28. The compressive force has caused flexible ring 12 to deform into a generally elongated elliptical shape so that pin 10 is now free to pass through the center opening of ring 12. With ring 12 thus distorted, pin 10 is free to rotate a full revolution about pin 22 with respect to ring 12. Once the compressive force is removed from ring 12, it will resume the normal circular shape as disclosed in FIGURE 2.

The devices disclosed in FIGURE 4 are considered typical of the types of members that can be secured together utilizing this invention. A tube or solid shaft 30 is firmly connected to a support member 32. Formed through shaft 30 generally perpendicular to the axis thereof is a hole 34. An annular outer member or cap 36 is mounted around the end of shaft 30. The inner diameter of cap 36 is larger than the outer diameter of shaft 30 so that the two members are longitudinally and rotatably movable with respect to each other. Formed through cap 36 generally perpendicular to the axis thereof is a hole 38 that corresponds in size and position with hole 34 in shaft 30. When cap 36 is pressed downwardly to a desired position with respect to shaft 30, holes 34 and 38 are aligned.

The members disclosed in FIGURE 4 are again disclosed in FIGURE 5 with holes 34 and 38 aligned. Pin 10 has been inserted through aligned holes 34 and 38 so that hinged end 20 extends from one side of cap 36 while second end 24 extends from the other side of cap 36. Shaft 30 and cap 36 are therefore locked together by pin 10 so that no relative movement between them is possible. It is noted in FIGURE 5 that the diameter of the central opening in ring 12 must be larger than the outside diameter of cap 36 so that ring 12 can be rotated over the end of cap 36, deformed as in FIGURE 3 so that it will pass over second end 24 of pin 10 and then allowed to resume its original circular shape to lock pin 10 in position. In FIGURE 5, pin 10 is restrained from movement in either direction by ring 12.

The easily releasable feature of this invention is clearly disclosed in FIGURE 5. To remove pin 10, it is a simple matter to deform ring 12, rotate it past end 24 and over the top of cap 36 until ring 12 and pin 10 are in the position shown in FIGURE 1. Pin 10 can then be removed from the hole. No tools are required and the process can be repeated an indefinite number of times without destroying the mechanical integrity of the securing device.

In FIGURE 6 there is disclosed a schematic representation of an explosive munition in which the securing device is used as a safing member. The munition includes a housing 38, in which a high explosive 40 is mounted. A detonator 42 is mounted adjacent high explosive 40. A spring loaded firing pin 44 is mounted opposite detonator 42 to fire the detonator. Under normal conditions, a spring loaded safing bar 46 is positioned between firing pin 44 and detonator 42. When the safing bar 46 is released, a spring 48 drives bar 46 upwardly to place a hole 50 in bar 46 in line with firing pin 44. Firing pin 44 may then be released by means not shown to detonate the explosive charge. In order to retain safing bar 46 in the safe position shown in FIGURE 6, the retaining pin of this invention is inserted through corresponding holes in casing 38 and safing bar 46. When it is desired to arm the munition, ring 12 is rotated to the position shown in FIGURE 1 and then pin 10 is pulled free. This allows spring 48 to drive safing bar 46 upwardly to position hole 50 in line with firing pin 44. Further safety devices could obviously be added to this munition if necesary in an actual application.

Generally speaking, the operation of the invention in FIGURE 6 is similar to its operation in FIGURE 5. In FIGURE 6, however, the outer housing is the fixed support member while the inner shaft or tube is the supported member. Housing 38 forms the shaft supporting member while safing bar 46 is the shaft.

The above description shows that the present invention may be utilized to secure a shaft within a shaft supporting member or to secure an outer member to a fixed shaft. The invention should not be considered to be limited to those specific embodiments disclosed in the drawings, however, since it is equally applicable to any situation where two or more members need be secured together by a pin type fastener. The only limitation on the use of this invention is that the hole through which the pin is inserted must be close enough to the end of the shaft so that the ring can be rotated over the end of the shaft and the second end of the pin. It is, of course, not necessary that the pin be hinged to the ring in the exact manner shown in the drawings. Other commonly used hinged configurations would be equally applicable.

While I have shown and described a preferred embodiment of this invention, further modifications and improvements will occur to those skilled in the art. I desire it to be understood therefore that this invention is not limited to the particular form shown and described and I intend in the appended claims to cover all modifications which do not depart from the spirit and scope of this invention.

I claim:
1. A device for securing an elongated shaft having a circular cross section to a shaft supporting member surrounding said shaft; said shaft and shaft supporting member each having corresponding holes formed therein; said device comprising: an elongated cylindrical pin for inserting through said holes to secure said shaft and shaft supporting member together; the length of said pin being greater than the outer diameter of said shaft supporting member so that first and second ends of said pin extend from opposite sides thereof; a flexible circular retaining ring having a diameter greater than the diameter of said supporting member and smaller than the length of said pin; said ring having a portion of the periphery thereof cut away to form an opening equal in size to the diameter of said pin; a pair of hinge members connected to said ring on opposing sides of said opening; said hinge members each having a hole formed therein and extending outwardly from said ring, with respect to the center of said ring, and in the plane of said ring; said pin having a hole formed laterally therethrough in said first end corresponding in size to said holes in said hinge members; and a pivot pin extending through said holes in said hinge members and said hole in said first end to pivotally connect said ring to said pin; said ring under normal conditions being pivotable less than one full revolution with respect to said pin with the portion of said ring opposite said opening striking said second end of said pin; said ring being constructed from a flexible material so that the normal circular shape can be distorted into an elongated generally elliptical shape to allow said ring to pass over said second end to secure said pin in said holes in said shaft and shaft supporting member.

2. A device for securing a shaft to a shaft supporting member surrounding said shaft; said shaft and shaft supporting member each having corresponding holes formed therein; said device comprising: a pin for inserting through said holes to secure said shaft and shaft supporting member together; the length of said pin being greater than the outer dimension of said shaft supporting member that first and second ends of said pin extend from opposite sides thereof; a flexible retaining ring having a diameter greater than said outer dimension of said supporting member and smaller than the length of said pin; said ring having a portion of the periphery thereof cut away to form an opening equal in size to the diameter of said pin; a pair of hinge members connected to said ring on opposing sides of said opening; said hinge members each having a hole formed therein, and extending outwardly from said ring, with respect to the center of said ring, and in the plane of said ring; said pin having a hole formed laterally therethrough in said first end corresponding in size to said holes in said hinge members; and a pivot pin extending through said holes in said hinge members and said hole in said first end to pivotally connect said ring to said pin; said ring under normal conditions being pivotable less than one full revolution with respect to said pin with the portion of said ring opposite said opening striking said second end of said pin; said ring being constructed from a flexible material so that the normal shape can be distorted to allow said ring to pass over said second end to secure said pin in said holes in said shaft and shaft supporting member.

References Cited by the Examiner

UNITED STATES PATENTS

| | | |
|---|---|---|
| 340,333 | 4/1886 | Ligget. |
| 2,514,594 | 7/1950 | Weiler. |
| 2,589,482 | 3/1952 | Downey _____ 85—8.3 |
| 2,759,388 | 8/1956 | Annis. |
| 3,011,801 | 12/1961 | Neumann. |
| 3,132,556 | 5/1964 | Doering et al. |
| 3,175,453 | 3/1965 | Williams _____ 85—8.3 |

FOREIGN PATENTS 865,078   1/1953   Germany.

CARL W. TOMLIN, *Primary Examiner.*

M. PARSONS, JR., *Assistant Examiner.*